W. B. AUSTIN.
DIRIGIBLE HEADLIGHT.
APPLICATION FILED FEB. 9, 1911.
992,142.
Patented May 16, 1911.
2 SHEETS—SHEET 1.
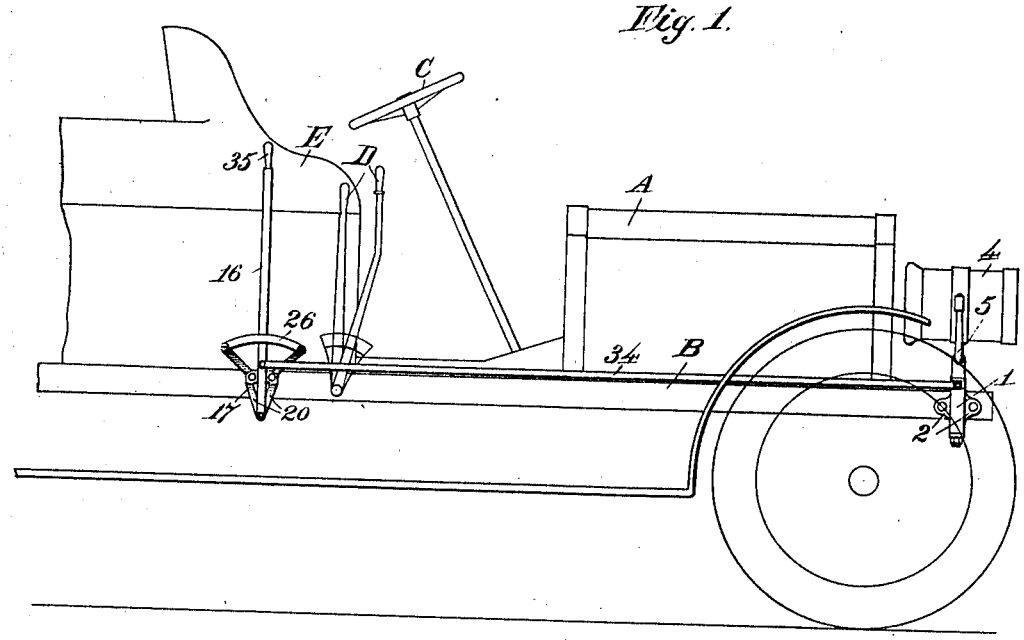
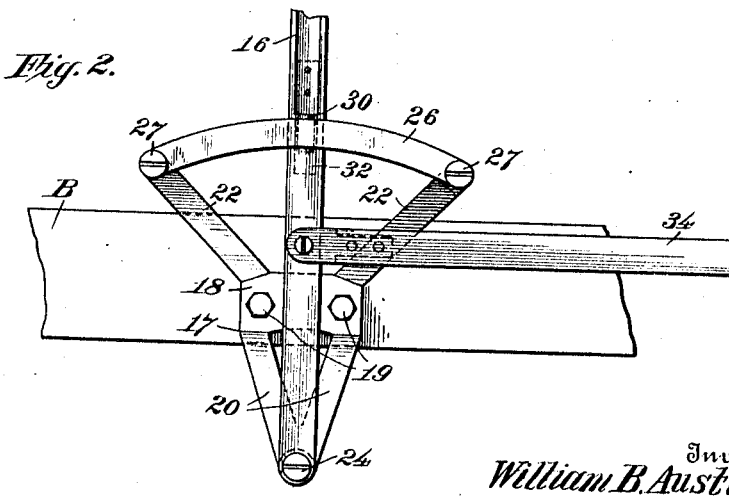
Witnesses
Inventor
William B. Austin
By Joshua R. H. Potts
Attorney

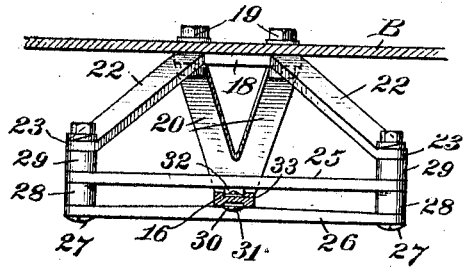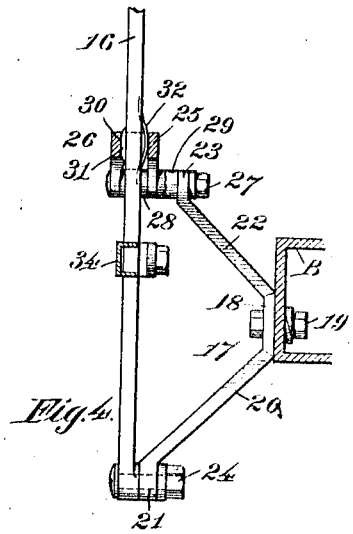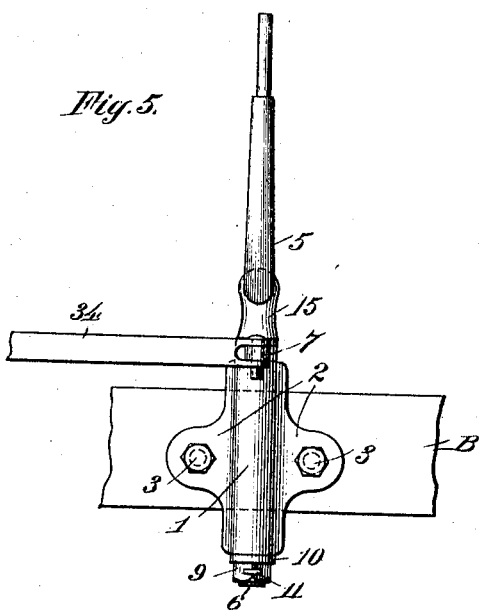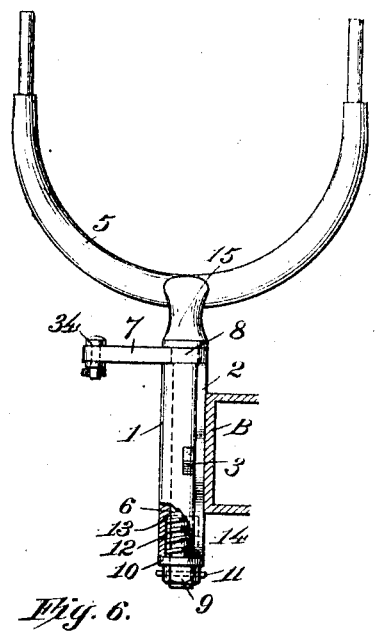

UNITED STATES PATENT OFFICE.

WILLIAM B. AUSTIN, OF WILMINGTON, DELAWARE.

DIRIGIBLE HEADLIGHT.

992,142. Specification of Letters Patent. Patented May 16, 1911.

Application filed February 9, 1911. Serial No. 607,637.

*To all whom it may concern:*

Be it known that I, WILLIAM B. AUSTIN, a citizen of the United States, residing at Wilmington, county of Newcastle, and State of Delaware, have invented certain new and useful Improvements in Dirigible Headlights, of which the following is a specification.

My invention relates to automobiles and particularly to the head lights thereof.

More specifically my invention relates to dirigible head lights for automobiles.

The object of my invention is to provide an automobile head light which may be manually operated to turn the light in any direction desired.

A further object of my invention is to provide a manually operated head light as mentioned equipped with means for normally holding the same in position to throw the light directly forward of the car.

Further objects of my invention are to provide a device of the class mentioned of such construction that it may be readily applied to substantially any automobile, and which may be readily and quickly operated from the driver's seat.

Other objects will appear hereinafter.

In carrying out my invention I mount the head light to turn upon a vertical axis and provide a hand lever adjacent to the driver's seat and readily accessible therefrom, and connect said lever with the head light so that throwing the lever will turn the light to the right or left as desired. I further provide a quadrant for guiding the lever and form the same with a notch or recess on one of its inner faces and equip the lever with a boss or lug to engage the recess to normally hold the light in forward position.

My invention consists generally in a device as above mentioned and in various details of construction and arrangement of parts all as will be fully described hereinafter and particularly pointed out in the claim.

My invention will be more readily understood by reference to the accompanying drawings forming a part of this specification and in which—

Figure 1 is a side elevation, in diagram, of the forward portion of an automobile illustrating a device embodying my invention applied thereto, Fig. 2 is a side elevation of the lower portion of the lever, the bracket to which it is attached, the quadrant and the reach rod, Fig. 3 is a plan view of the same, the lever being shown in section, Fig. 4 is a front elevation of the same with the quadrant illustrated in section, Fig. 5 is a side elevation of the head light bracket and mounting, and Fig. 6 is a front elevation of the same.

Referring now to the drawings A indicates an automobile, B the chassis thereof, C the steering wheel and D the gear and brake levers. E indicates the driver's seat. These portions are represented conventionally in the drawings as they form no portion of my invention and detail illustration thereof is therefore unnecessary.

Secured to the forward portion of the car, preferably to the frame or chassis B is a bracket comprising a vertically disposed sleeve 1 and a pair of base flanges 2, the latter being perforated to receive the bolts 3 by which it is secured in position.

4 indicates the head light which is mounted upon the usual yoke 5. The yoke 5 is provided with a depending or vertically disposed stem 6 rotatably mounted in the sleeve 1. Fixed to the stem 6 is a laterally projecting arm 7. This is preferably secured to the upper end of the stem and rests upon the upper end of the sleeve 1, the end of the stem being squared as at 8 whereby the arm is secured to the stem to prevent relative rotation of the parts. The lower end of the stem projects below the sleeve 1 and is provided with a nut 9 between which and the end of the sleeve is interposed a washer 10.

11 indicates a cotter pin extending through the nut and the stem for securing the nut in position. The lower end of the bore of the sleeve is increased in diameter as at 12, forming an annular internal shoulder 13, and interposed between said shoulder and the washer 10 is a spring 14 arranged about the adjacent portion of the stem.

15 indicates a head on the stem 6, the lower end of which rests upon the inner end of the arm 7.

16 indicates a hand lever pivotally mounted adjacent the driver's seat E upon a bracket 17 fixed to the car and preferably to the chassis. The bracket 17 comprises a base plate 18 apertured to receive the bolts 19 by means of which it is secured in position, a pair of outwardly and downwardly inclined arms 20 converging toward the bottom and terminating in a vertically disposed portion 21, and a pair of outwardly and upwardly divergent arms 22 each terminating in a vertically disposed end portion 23. Extending through the lower portion 21 of the bracket is a bolt 24 upon which is pivotally mounted the lever 16. Secured to the portions 23 of the bracket is the quadrant comprising a pair of parallel spaced members 25 and 26. These are secured to the bracket by bolts 27 and are spaced apart and from the bracket portions 23 by collars 28 and 29 respectively. The lever 16 projects upwardly between the parallel members of the quadrant. The member 25 of the quadrant is preferably of uniform thickness throughout its length whereas the member 26 is thicker at the center and tapers toward each end, the additional thickness of the metal being upon the inside whereby the space between the quadrant members is contracted toward the center. At the center, which is the thickest portion, the member 26 is provided on its inner face with a vertically disposed notch or recess 30, the face of which is cylindrically curved, and the lever 16 is provided with a boss or lug 31 adapted to rest in said recess when the lever is in central position. The space between the members 25 and 26, even at its most contracted portion, is of greater width than the thickness of the lever in order that the latter may have sufficient lateral play to permit withdrawal of the lug from the recess. Fixed to the inner face of the lever is a leaf spring 32 which bears against the member 25 and normally holds the lever in engagement with the member 26. The spring is preferably arranged in a vertically disposed channel or groove 33 in the lever to prevent displacement thereof.

Extending from the lever 16 to the arm 7 is a reach rod 34. This is of such length that when the lug 31 rests within the recess 30, the head light will be turned to throw the light directly forward. It is obvious that if the lever 16 is thrown backwardly the light will be thrown to the right, and if it be thrown forwardly, the light will be thrown to the left. The light may be turned to any angle desired and the spring is sufficiently strong to create enough friction between the lever and the quadrant to hold it in position especially when the car is standing still. The lever 16 is so arranged on the car that the handle 35 thereof is within convenient reach of the driver from the seat E. When traveling along dark roads the light may be turned from side to side or in either direction desired to ascertain the condition of the road or the direction, and when the machine is standing still the light may be thrown in the desired direction to illuminate the path which the parties wish to travel on leaving the car or returning to the same. The device is of simple construction and may be readily applied to substantially any car.

Having described my invention what I claim as new and desire to secure by Letters Patent is:

In a device of the class described, a bracket adapted to be secured to an automobile, a lamp support mounted therein to rotate upon a vertical axis, a second bracket adapted to be secured to the automobile adjacent the driver's seat, a quadrant on said bracket comprising a pair of parallel members, a lever pivotally mounted on said bracket and projecting upwardly between said members, a lug on one side of said lever, one member of said quadrant being notched at substantially the center to receive said lug, a spring on the opposite side of said lever constantly engaging the other member of said quadrant, and a rod connecting said lever and said lamp support, substantially as described.

In testimony whereof I have signed my name to this specification in the presence of two subscribing witnesses.

WILLIAM B. AUSTIN.

Witnesses:
HENRY C. ROBINSON,
CHARLES GREEN.